Jan. 3, 1928. 1,654,718
S. O. BIGNEY
BRACELET HOOK
Filed March 25, 1927
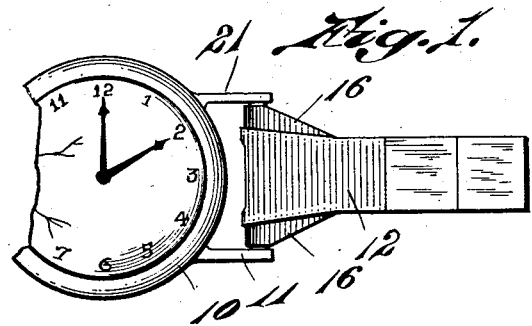
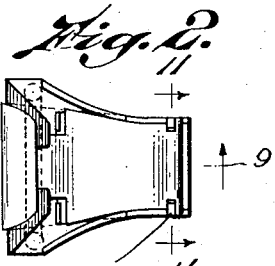
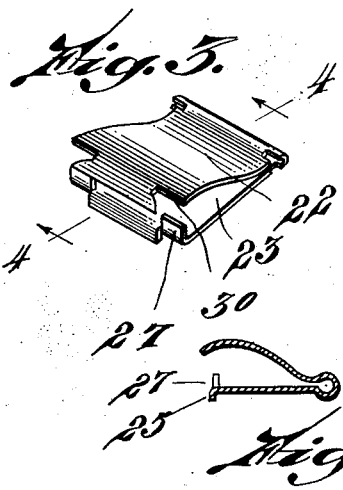
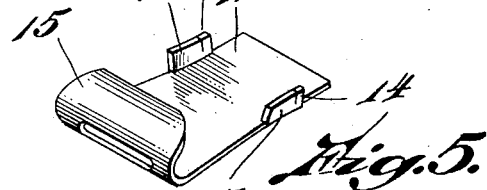
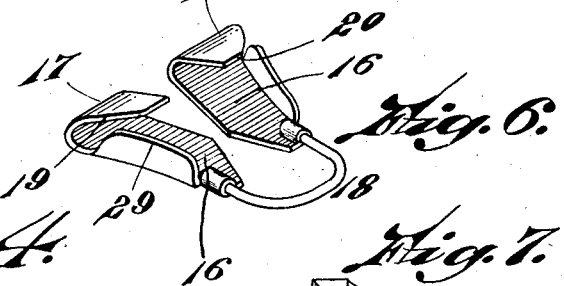
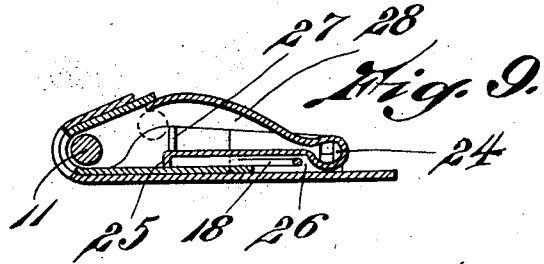
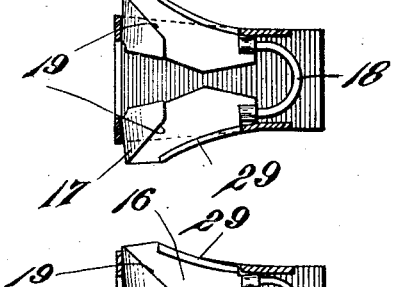
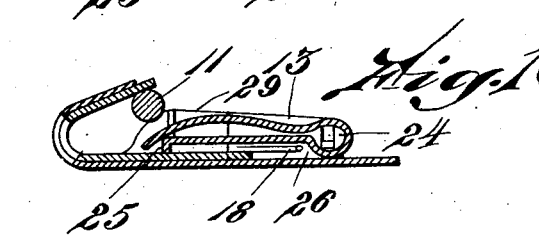
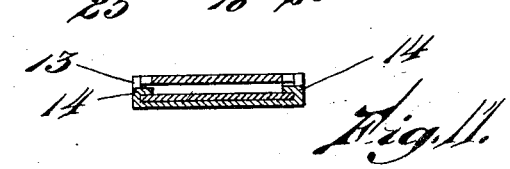
INVENTOR.
Sidney O. Bigney.
BY
Barlow & Barlow
ATTORNEYS.

Patented Jan. 3, 1928.

1,654,718

UNITED STATES PATENT OFFICE.

SIDNEY O. BIGNEY, OF ATTLEBORO, MASSACHUSETTS, ASSIGNOR TO S. O. BIGNEY & COMPANY, OF ATTLEBORO, MASSACHUSETTS, A CORPORATION OF MASSACHUSETTS.

BRACELET HOOK.

Application filed March 25, 1927. Serial No. 178,301.

This invention relates to a so-called bracelet hook; and is an improvement on my construction disclosed in Patent No. 1,619,014, dated March 1, 1927; and has for its object to provide a hook of this character adapted more particularly for connecting the end of a bracelet to the bail of a wrist watch or the like, the laterally-extending members being so formed on their outer edges that they may be forced inwardly upon engagement with the bail of a wrist watch to force the members inwardly to the desired position.

A further object of the invention is the provision of stop means for limiting the movement of the bail beneath the closing tongue for the hook to assist in operating the device.

A still further object of the invention is to fold back a portion of the hook-closing tongue so as to provide a space for the springs for operating the laterally-extending members and also to form stops for the limiting of the movement of the watch bail beneath the tongue.

With these and other objects in view, the invention consists of certain novel features of construction, as will be more fully described, and particularly pointed out in the appended claims.

In the accompanying drawings:

Figure 1 is a top plan view illustrating a bracelet hook as connected to the bail of a wrist watch.

Figure 2 is a bottom plan view thereof.

Figure 3 is a perspective view of the tongue.

Figure 4 is a central section thereof.

Figure 5 is a perspective view of the body portion of the hook.

Figure 6 is a perspective view of the laterally extending members connected by an operating spring.

Figure 7 is a sectional view showing the laterally adjustable members mounted in the body with the members in extended position.

Figure 8 is a view similar to Figure 7 with the members in contracted position to narrow the width of the device.

Figure 9 is a sectional view on line 9—9 of Figure 2 with the tongue in hook-closing position.

Figure 10 is a view similar to Figure 9 with the tongue in open position.

Figure 11 is a sectional view on line 11—11 of Figure 2.

It is found in the practical construction and operation of hooks for attaching the ends of a bracelet to a wrist watch, of advantage to provide a hook whereby the operating width may be varied to fit watch bails of different watches so that merchants selling bracelets will not be obliged to carry in stock bracelets having different end hooks for the various styles and sizes of watches on the market, and in order to accomplish this, I have provided laterally-extending hook members which have their under engaging ends tapered or inclined, or their outer edges so that as the extremity is passed through the bail of the watch the laterally-extending members will engage the bail to move the members inward to the desired position and at the same time I have utilized a portion of the hook-closing tongue for forming a stop for limiting the movement of the watch bail beneath the tongue so that the bail can not interfere with the operation of the hook tongue; and the following is a detailed description of the present embodiment of this invention and showing one construction of bracelet hook by which these advantageous results may be accomplished:—

With reference to the drawings, 10 designates a wrist watch having a bail 11 to which a bracelet hook forming the subject matter of this invention is attached, the hook comprises a body portion 12 having side walls 13 slit to provide fingers 14, the body portion having an extended shank which is shaped at one end to form a hook 15. Within this body there is mounted laterally-adjustable members 16 which are also formed hook-shaped at their end portions 17 and are connected by a U-shaped resilient metal spring 18 tending to move the members 16 outwardly relative to the body, as shown in Figure 7. The outer edges of the hook portions 17 are inclined as at 19 so that the ends 20 of these members may readily engage a watch bail of any width and as the inclined edges engage the side portions 21 of the bail these laterally-extending members are forced inwardly to assume the desired position and fill the opening in the bail through which they pass.

A tongue 22 for closing the hook is mounted in the body and has a folded back portion 23 which forms an eye 24 for connecting the bracelet to the hook, the folded-back portion having an offset leg 25 to provide a space 26 to receive and house the spring 18 holding the same in its desired position in the body. The end of the folded-back portion is bent upwardly to provide a stop 27 to limit the movement of the watch bail beneath the tongue and prevent it from moving back into the space 28 between the tongue and the body and obstruct the opening action of the tongue.

The tongue is secured in position in the body by folding inwardly the fingers 14 of the body to prevent movement of the tongue relative thereto.

In order to provide a more finished appearance for the hook, flanges 29 are provided on the edges of the laterally-extending members to extend the side walls 13 of the body and close the opening between the body and the tongue; also in order that the action of the tongue will not be limited by the stops 27, I have recessed the tongue as at 30, so that the stops 27 will be received within the recessed portions when the tongue is depressed, as illustrated in Figure 10, to permit full opening movement of the hook for disengagement of the bail therefrom.

From the foregoing, it will be seen that I have provided a hook which is an improvement in many ways over my former construction referred to in the above said patent and which may be readily manipulated by merely engaging the end of the hook with the bail.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A bracelet hook comprising a body portion, a pair of laterally-adjustable hook members in said body, the outer edges of the turned back portions of said members being inclined toward each other adjacent their ends to permit the hook to be readily inserted into the bail of a wrist watch or the like of a width less than the maximum width of the hook to cause the members to be contracted automatically by engagement with the sides of the bail as the hook is passed into engagement therewith.

2. A bracelet hook comprising a body member having a shank shaped at one end to form the hook and a laterally adjustable member carried by and cooperating with said hook for varying its operating width, the outer edge of said laterally-adjustable member being inclined and narrowest at its engaging end to permit this end to be readily inserted into a watch bail or the like of a width less than the maximum width of the hook and to automatically adjust itself to fit bails of different sizes.

3. A bracelet hook comprising a body member with shank and hook portions, a relatively movable member in said hook portion, and a spring acting on said member to move the same to extended position to enlarge the operating width of the hook, the outer edge of said laterally-adjustable member being inclined and narrowest at its engaging end to permit this end of the hook to be contracted by the watch bail if of a width less than the maximum width of the hook to fit the bail.

4. A bracelet hook comprising a body member having a hook at one end thereof, and a pair of spring-pressed laterally extendible members in the hook portion to vary its operating width, the outer edge of said laterally-adjustable member being inclined and narrowest at its engaging edge to permit the end of the hook to be readily inserted into a watch bail and said member forced inwardly by the bail to fit the same.

5. A bracelet hook comprising a body member having a hook at one end, and a pair of spring-pressed members connected together by a U-shaped spring acting to spread said members relatively laterally in the hook to vary the operating width of the hook, the outer edge of said laterally-adjustable member being inclined and narrowest at its engaging edge to permit the end of the hook to be inserted into a watch bail and said member forced inwardly by the bail to its desired position.

6. A bracelet hook comprising a body portion having a shank shaped at one end to form a hook, a tongue for closing said hook, and a stop carried by said body for limiting the movement of the watch bail beneath the tongue.

7. A bracelet hook comprising a body portion having a shank shaped at one end to form a hook, a tongue for closing said hook, a stop carried by said body for limiting the movement of the watch bail and prevent it from getting beneath the tongue and a recess in said tongue to receive said stop to permit the tongue to be fully depressed.

8. A bracelet hook comprising a body portion having a shank shaped at one end to form a hook, a tongue for closing said hook, and a stop carried by said body for limiting the movement of the watch bail beneath the tongue and having a portion folded beneath itself and turned adjacent its end to form a stop for limiting the movement of the watch bail beneath the tongue.

9. A bracelet hook comprising a body portion having a shank shaped at one end to form a hook, a pair of laterally adjustable hook members for regulating the working width of the device, a spring for pressing said members outwardly, a tongue for closing said hook having a portion folded beneath the tongue and spaced from the body to receive said spring to hold it in position.

10. A bracelet hook comprising a body portion having a shank shaped at one end to form a hook, a pair of laterally-adjustable hook members for regulating the working width of the device, a tongue for closing said hook, and side flanges on said members to close the marginal openings between said shank and tongue.

In testimony whereof I affix my signature.

SIDNEY O. BIGNEY.